United States Patent [19]
Corsmeier et al.

[11] 3,973,874
[45] Aug. 10, 1976

[54] IMPINGEMENT BAFFLE COLLARS

[75] Inventors: Robert J. Corsmeier; Bernard L. Koff, both of Cincinnati, Ohio

[73] Assignee: General Electric Company, Cincinnati, Ohio

[22] Filed: Sept. 25, 1974

[21] Appl. No.: 509,032

[52] U.S. Cl. ............................ 416/97 A; 416/145; 416/500
[51] Int. Cl.² ......................................... F01D 5/18
[58] Field of Search ........................... 416/96–97, 416/500, 145, 92, 96 A; 415/115–116

[56] References Cited
UNITED STATES PATENTS

| | | | |
|---|---|---|---|
| 2,568,726 | 9/1951 | Franz | 416/90 |
| 2,783,023 | 2/1957 | Stalker | 416/500 X |
| 2,862,686 | 12/1958 | Bartlett | 416/500 X |
| 2,873,944 | 2/1959 | Wiese et al. | 416/96 |
| 3,540,810 | 11/1970 | Kercher | 416/90 |
| 3,644,060 | 2/1972 | Bryan | 416/97 |
| 3,700,348 | 10/1972 | Corsmeier et al. | 416/97 |
| 3,715,170 | 2/1973 | Savage et al. | 416/96 |
| 3,732,031 | 5/1973 | Bowling | 416/96 |
| 3,767,322 | 10/1973 | Durgin et al. | 416/97 |
| 3,806,275 | 4/1974 | Aspinwall | 416/97 |

FOREIGN PATENTS OR APPLICATIONS

| | | | |
|---|---|---|---|
| 940,226 | 4/1956 | Germany | 416/500 |
| 891,635 | 3/1944 | France | 416/500 |
| 981,599 | 5/1951 | France | 416/500 |

*Primary Examiner*—Everette A. Powell, Jr.
*Attorney, Agent, or Firm*—Dana F. Bigelow; Derek P. Lawrence

[57] ABSTRACT

The impingement baffle insert of a turbomachinery blade is provided with a plurality of collars around a portion thereof so as to ensure a proper impingement distance between the baffle and the inside wall of the airfoil and act as a wear surface against the inside wall to thereby prevent wear to the insert wall surface. The collars are affixed to the insert in preselected positions and frictionally engage the blade inner wall in close fit relationship to position the inserts and assume any wear that may result from vibration of the insert within the chamber. The inserts may have grooves formed therein to allow equalization of pressure on both sides thereof, and they may further have chamfered edges on one end thereof so as to facilitate installation into the turbine blades.

6 Claims, 5 Drawing Figures

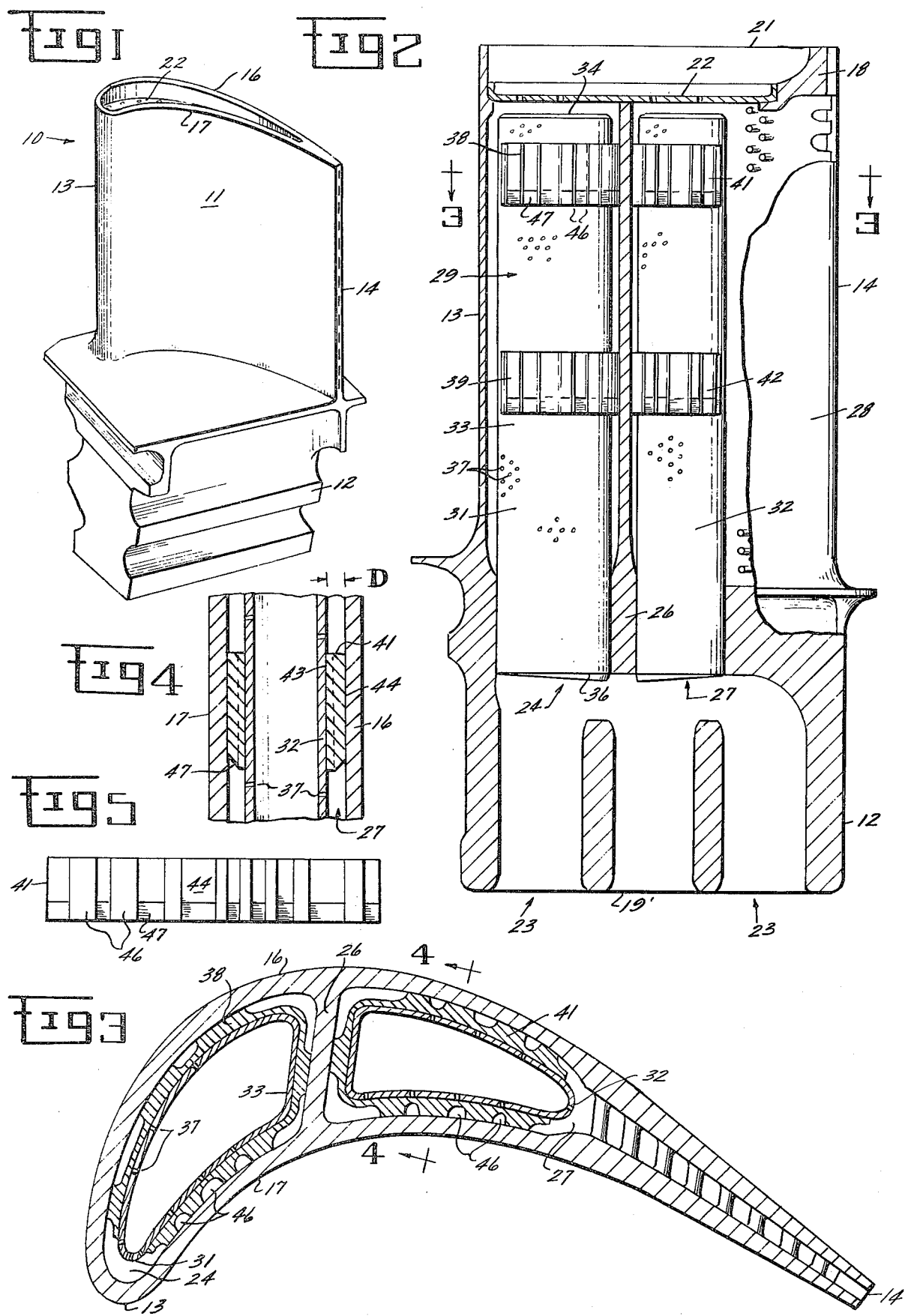

IMPINGEMENT BAFFLE COLLARS

BACKGROUND OF THE INVENTION

This invention relates generally to turbomachinery blading and, more particularly, to an air-cooled turbine blade or stator nozzle having an impingement baffle disposed therein for impinging cooling air on the internal blade airfoil wall.

In order to obtain satisfactory performance of gas turbine engines it has been necessary to increase the maximum turbine operating temperatures to levels which are significantly higher than the melting point of available blade materials. Consequently, high pressure turbine blades of all modern gas turbine must necessarily be cooled to lower temperatures to enable them to perform their functions for a required engine life. A common method by which the blades are cooled is to bleed air from the compressor and deliver it to the turbine either internally of the engine through passageways formed by the turbine and compressor rotor shafts and discs or through piping mounted externally of the engine.

One of the most effective methods of cooling turbine rotor blades and turbine stator nozzles is that of impinging cooling air on the inner walls thereof by means of an impingement baffle inserted into the hollow airfoil. The impingement baffle which is formed in substantially the same shape as the inside of the airfoil is spaced from the airfoil inner walls by a distance commonly known as the impingement distance. Cooling air is forced into the internal recess of the baffle, and then passes through a plurality of small holes in the baffle walls to impinge on the internal walls of the airfoil in a high velocity rate, thereby resulting in high efficiency cooling of the blade airfoils.

The impingement distance is critical in the design of the combination to the extent that the proper airflow distribution and velocity is desired. A common method of controlling the impingement distance is to form a plurality of dimples which protrude outwardly from the baffle walls and frictionally engage the inner walls of the blade. In addition to establishing impingement distance, the dimples also serve to position and support the baffle. A problem arises, however, when the dimples begin to wear thin because of vibration and thermal movement of the insert. Since the baffles are composed of a material which is necessarily light in weight, exhibits high strength capabilities, and is resistant to high temperatures, they tend not to demonstrate good wear characteristics. The integrally formed dimples in the baffles have a minimal contact area and, consequently, tend to wear thin resulting in fatigue cracks which creep from the thin dimple surface to a point of failure in the baffle.

It is, therefore, an object of this invention to provide a turbomachine blade which will operate in an environment of high temperature and high speed movement without resultant failure.

Another object of this invention is to provide a turbine blade baffle insert whose performance and strength characteristics are not appreciably affected by continued vibrational movement within the turbine blade cavity.

A further object of this invention is the provision for a turbine blade insert which is economical to manufacture, effective in use and extremely functional in use.

These objects and other features and advantages will become more readily apparent upon reference to the following description when taken in conjunction with the appended drawings.

SUMMARY OF THE INVENTION

Briefly, in accordance with one aspect of the invention, a plurality of wear elements are placed between the impingement baffle insert and the inner walls of the blade, so as to establish a desired impingement distance and prevent direct frictional contact between the blade inner wall and the insert itself. The wear elements which are in direct frictional contact with the blade inner wall will gradually erode because of normal wear, but are of a thickness sufficient to withstand prolonged wear resulting from normal usage.

In another aspect of the invention, wear elements comprise collars surrounding portions of the insert, and having transverse slots formed thereacross to equalize pressures on each side thereof. The collars may further have a chamfered edge on one end thereof to facilitate the placement of the insert into the blade inner recess.

By a further aspect of the invention, the collar may have a plurality of holes formed therein which communicate with holes in the insert wall and act as extensions thereof to direct the flow of cooling air over the blade inner wall surface.

The collar is preferably attached to the insert by way of brazing or welding or the like.

In the drawings as hereinafter described, the preferred embodiment is depicted; however, various other modifications and alternate constructions can be made thereto without departing from the true scope and spirit of the invention.

BRIEF DESCRIPTION OF THE DRAWINGS

FIG. 1 is a perspective view of a turbine blade of the type which employs an internally disposed impingement baffle of the present invention;

FIG. 2 is a side elevational view thereof drawn in partial section and to an enlarged scale, to show the features of the present invention;

FIG. 3 is a cross-sectional view of a turbine blade as seen along line 3—3 of FIG. 2 with the impingement baffles of the present invention shown therein;

FIG. 4 is a partial sectional view of the turbine blade as seen along the line 4—4 of FIG. 3; and FIG. 5 is a side elevational view of the wear collar of the present invention as shown in its extended and uninstalled condition.

DESCRIPTION OF THE PREFERRED EMBODIMENT

Referring now to the drawings wherein like numerals correspond to like elements throughout, reference is initially made to FIG. 1 wherein a turbine blade is indicated generally at 10 as comprising an airfoil portion 11 and an attachment or root portion 12 adapted to secure the blade, in a well-known manner, to a turbine rotor (not shown) with the airfoil portion 11 extending generally radially across the motive fluid flow passage. The airfoil portion 11 includes a leading edge 13 and a chordwise spaced trailing edge 14 which are interconnected by convex and concave side wall portions 16 and 17, respectively. The airfoil portion 11 is suitably shaped in a well-known manner so as to efficiently extract energy from the motive fluid as it flows spanwise of the blade to thereby impart rotary motion to the rotor.

Referring to FIG. 2, the blade structure of this invention is preferably formed of a hollow, cast member 18 having an open inner end 19 and an outer or distal end 21. The outer end 21 is closed by a tip cap 22 which may be cast integrally with the member 18 or suitably secured thereto as by welding or brazing. The root or attachment portion 12 is provided with a plurality of plenums or receiving chambers 23, for receiving a flow of suitable cooling fluid through the open inner end 19. A leading edge chamber 24 extends longitudinally of the airfoil portion 11 and is cooperatively formed by the cast member 18, a central rib portion 26, and the tip cap 22. Similarly, a midspan chamber 27 extends longitudinally of the airfoil portion 11 and is cooperatively formed by the rib portion 26, of the cast member 18, a trailing edge portion 28 of the cast member 18, and the tip cap 22.

In order to provide efficient cooling for the leading edge 13 and the convex and concave wall portions 16 and 17, respectively, means designated generally at 29 are provided in flow communication with the cooling fluid of the chamber 23 for impinging cooling fluid against certain portions of the inner walls of the cast member 18 as a plurality of high velocity jets. The impingement means 29 preferably comprises a pair of thin-walled, tubular inserts, or impingement baffles, 31 and 32 which are disposed in chambers 24 and 27, respectively, with their walls lying in close spaced relationship to the chamber walls. For purposes of description, the impingement inserts 31 and 32 should be considered as similar in basic construction and, to avoid repetition, only the insert 31 will be described as comprising closed wall 33, an outer or distal end 34, and an open end 36, in flow communication with the cooling fluid receiving chambers 23. The closed wall 33 is preferably composed of a thin, lightweight material having a plurality of small openings or perforations 37 formed therein and through which the cooling fluid is expanded and impinged against the chamber wall as a plurality of high velocity fluid jets.

Insertion of the impingement baffles into the blade chambers can be accomplished in either of two ways. In the most commonly used method the insert is placed in the blade cavity from the outer end 21 by removal of the end cap 22, and secured therein by firmly affixing the inner end 36 thereof, as by welding or brazing, to the cast member 18 proximate the fluid chambers 23 as is shown in FIG. 2.

Another less commonly used approach is to insert the impingement baffles 31 from the inner end 19 and secure them with a flange attached to the inner end of the inserts. The flange rests against the blade inner end 19 so as to restrain the baffle against movement from centrifugal force. Such an arrangement is advantageous since it allows for easy removal of the inserts. Each of these arrangements, however, are considered to be satisfactory to meet the requirements for particular blade designs.

In addition to the securing of the impingement baffle within the blade cavities, as discussed hereinabove, it is also necessary to properly locate them within the cavity so as to obtain the proper cooling fluid distribution and velocity of flow. The means by which the present invention accomplishes this function is by way of a wear element or a plurality of wear elements disposed in close fit relationship between the outer walls of the impingement baffles 31 and 32 and the inner walls of the blade chambers 24 and 27. The wear element is preferably of a light material and of a size which does not restrict the impinging function of the insert, but yet one which provides the necessary spacing around the entire surface of the impingement baffle. A preferred wear element is that shown in FIGS. 2 and 3 comprising a collar or a plurality of collars surrounding the impingement baffle and frictionally engaging the walls of the inner chambers 24 of the blade. The embodiment of the present invention as shown in FIGS. 2 and 3 includes upper and lower longitudinally spaced collars 38 and 39, respectively, applied to the insert 31 and similar upper and lower collars 41 and 42 similarly applied to the insert 32. It should be recognized that various other alternative collar arrangements may also be used in keeping with the scope of this invention. For example, a single large collar may be disposed at the central portion of the insert, or a greater number of collars may be longitudinally spaced along the insert. Alternatively, the wear element may take the form of a plurality of pads located on the periphery of the insert in no particular pattern, but having for their function the provision for proper spacing around the entire wall surface of the insert. This critical spacing between the insert and the chamber wall, commonly known as the impingement distance, is indicated by the dimensional letter "D" in FIG. 4.

In addition to providing for the proper impingement distance as described hereinabove, the wear elements also act to prevent direct frictional wear to the insert as it is caused to move within the baffle chambers by reason of thermal vibrations and centrifugal forces. Referring to FIGS. 3 and 4, the collar 41 is similar to collars 38, 39 and 42, and is adapted to surround the insert 32, with its inner side 43 contiguous with the periphery thereof. Its outer side 44 is adapted to be disposed in a close fit relationship within the chamber 27, so as to maintain the position of the insert within the chamber, and not allow any significant movement therein. More significantly, the collar 41 acts to maintain the impingement distance around the entire wall surface of the insert and prevents any friction between the chamber walls and the insert itself. Composition of the collar is preferably of a material hard enough so that it is not significantly eroded by frictional wear against the chamber walls, and yet of a composition which allows it to be exposed to high temperatures without significant thermal expansion or deformation. Further, the collars are preferably composed of a material whose shape is easy to conform to the insert periphery, and one which can be rigidly attached to the periphery by welding or brazing or the like.

It should be understood that the collars of this invention do not necessarily require fixation to the insert. For example, in the case of compression loaded inserts, where they are installed from the inner end and can be forced outwardly by centrifugal force of the revolving blade, the collars may be snugly disposed within the chamber so as to loosely receive the insert when in a shut-down condition, but establish a tight fit relationship as soon as the rotor motion commences. This, of course, presumes a slightly tapered condition of the insert wherein the cross-sectional area increases toward the outer end of the insert.

Another alternative is to form the collars as an integral part of the baffle. This, of course, assumes they are composed of the same material and requires that it be carefully chosen so as to demonstrate the high strength and light weight characteristics as well as good wear characteristics.

In the preferred embodiment of the collar as shown in FIGS. 2, 4 and 5, it is desirable to have a plurality of grooves 46 formed transversely therein across the collar (or aligned with the longitudinal axes of the blade), so as to allow gases to pass therethrough so as to equalize pressures on each side of the collar. These grooves can be formed by simply machining the collar prior to its being formed as shown in FIG. 5. Further, the collar preferably has a chamfered or beveled surface 47 extending along one end thereof so as to facilitate installation of the insert into the blade chamber. This is desirable since the collar-chamber wall fit is necessarily a close tolerance fit to prevent any unnecessary vibrations.

A typical procedure for the installation of the collar on the insert is as follows. The strap material as shown in FIg. 5 is machined to the proper thickness as determined by the relative sizes of the insert 32 and and the blade chamber 27. The grooves 46 are then formed as by machining, and the end intended for first entry into the chamber is beveled to obtain the surface 47. The collar elements 41 and 42 are then formed around the outer side of the insert in the desired longitudinal location, and secured thereto as by welding or the like. Impingement holes 37 may be installed in the insert prior to the mounting of the collar, or, alternatively, they may be imposed in both the insert and the collar by a method such as laser drilling or the like. The insert 32 is then placed with its surrounding collars into the chamber and secured in a manner as discussed hereinbefore.

While the present embodiment is shown as used with a rotatable turbine blade, it will be understood that it may also be used with turbine stator nozzles. The term "blade" as used in this specification is thus intended to include all rotating and stationary turbomachinery blades. These and other modifications of the disclosed embodiments will occur to those skilled in the art within the scope of the present inventive concepts which are therefore to be limited solely to the subject matter claimed.

Having thus described the invention, what is claimed as novel and desired to be secured by Letters Pat. of the United States is:

1. An improved rotatable turbomachinery blade of the type having a hollow cavity defining an internal wall surface, a thin-walled cooling insert having a plurality of cooling holes formed therein and adapted to be positioned within said cavity for the impingement of coolant on said internal wall surface, means for accurately positioning said insert with respect to said wall surface and means for delivering coolant to the interior of said insert, wherein the improvement comprises: a wear element rigidly connected to said insert for frictionally engaging said internal wall surface and preventing direct frictional contact between said internal wall surface and said insert, said wear element surrounding a substantial chordwise portion of said insert and being constructed of alternate solid and scalloped portions, said solid portions providing lateral support of said insert within said cavity and said scalloped portions providing for the flow of cooling air between said insert and said internal wall surface.

2. The improvement as set forth in claim 1 wherein said wear element solid portions are of a predetermined thickness and act to maintain a predetermined distance between said insert and said wall surface.

3. The improvement as set forth in claim 1 wherein said insert has a plurality of holes formed therein to provide fluid communication between the interior and exterior thereof, and further wherein said wear element has a hole formed therein which forms an extension of one of said insert holes.

4. The improvement as set forth in claim 1 wherein said wear element is chamfered at one end thereof to provide a gradual transition between said insert and the outer surface of said wear element.

5. An insert for use with a hollow turbomachinery blade comprising:
   an elongate baffle member adapted to be placed within the hollow blade;
   means for accurately positioning said baffle member with respect to the inner walls of said blade; and
   a collar rigidly connected to and surrounding at least a portion of said baffle member to frictionally engage said blade inner walls to thereby prevent direct frictional contact between said blade inner walls and said baffle member, said collar being constructed of alternate solid and scalloped portions, said solid portions providing lateral support of said insert within said cavity and said scalloped portions providing for the flow of cooling air between said insert and said blade inner walls.

6. The improvement as set forth in claim 1 wherein the thickness of said wear element solid portions are substantially greater than that of the wall of said insert.

* * * * *